United States Patent
Liao et al.

(10) Patent No.: US 7,518,351 B2
(45) Date of Patent: Apr. 14, 2009

(54) SWITCHING REGULATOR OVER VOLTAGE REDUCTION CIRCUIT AND METHOD

(75) Inventors: Chiawei Liao, San Jose, CA (US); Robert C. Dobkin, Monte Sereno, CA (US)

(73) Assignee: Linear Technology Corporation, Milpitas, CA (US)

( * ) Notice: Subject to any disclaimer, the term of this patent is extended or adjusted under 35 U.S.C. 154(b) by 222 days.

(21) Appl. No.: 11/131,338

(22) Filed: May 18, 2005

(65) Prior Publication Data

US 2006/0261792 A1 Nov. 23, 2006

(51) Int. Cl.
G05F 1/00 (2006.01)
(52) U.S. Cl. ............... 323/284; 323/282; 323/351
(58) Field of Classification Search .......... 323/282, 323/284, 351
See application file for complete search history.

(56) References Cited

U.S. PATENT DOCUMENTS

| | | | |
|---|---|---|---|
| 6,288,524 B1 * | 9/2001 | Tsujimoto | 323/285 |
| 6,366,070 B1 * | 4/2002 | Cooke et al. | 323/284 |
| 7,042,203 B2 * | 5/2006 | Van Der Horn et al. | 323/285 |
| 7,132,820 B2 * | 11/2006 | Walters et al. | 323/288 |
| 2002/0125871 A1 * | 9/2002 | Groom et al. | 323/284 |
| 2004/0095105 A1 | 5/2004 | Nakata | |

OTHER PUBLICATIONS

Extended European Search Report Issued in corresponding European Patent Application No. EP 05 25 5668, dated Sep. 8, 2006.

* cited by examiner

*Primary Examiner*—Akm E Ullah
*Assistant Examiner*—Ramy Ramadan
(74) *Attorney, Agent, or Firm*—McDermott Will & Emery LLP

(57) ABSTRACT

Output voltage overshoot of a switching regulator is controlled by deactivating switching operation when a signal proportional to the output voltage exceeds a variable threshold level, with the threshold level set as a function of regulator output current. In accordance with an embodiment, a difference signal is generated that corresponds to a difference between an output voltage feedback signal and a constant reference voltage. The generated difference signal is combined with a signal proportional to load current to obtain an adapted threshold level. The adapted threshold level is greater than the level of the constant reference voltage. A regulator switch is reset to an off state when the output voltage feedback signal exceeds the adapted threshold level.

6 Claims, 4 Drawing Sheets

SWITCHING REGULATOR OVER VOLTAGE REDUCTION CIRCUIT AND METHOD

TECHNICAL FIELD

This disclosure is related to switching regulators, and more particularly to control of output voltage overshoot.

BACKGROUND

The use of switching regulators to control a DC output voltage at a level higher than, lower than, or the same as an input voltage is well known. Typically, one or more switches are activated to supply current pulses via an inductor to charge an output capacitor. The output voltage level is maintained at a desired level by adjusting the on and off times of the switching pulses in accordance with output voltage and load conditions. When there is an abrupt change in load conditions, the controller may not be able to react sufficiently to prevent an output voltage overshoot that exceeds specification tolerances. For example, a load may suddenly be changed from maximum current operation to low current usage; the regulator may continue to output high current to increase the output voltage before responding sufficiently to the changed condition.

In many portable systems, when the output load is light, the switching regulators are controlled to go into a power saving sleep mode. In the sleep mode, the regulator reduces the operating current by turning off some internal circuitry while operating in a burst mode. In this burst mode, the regulator output is initially higher than the programmed level and the internal circuitry is turned off to save power consumption. Due to the output load, the output voltage then drifts lower to the programmed level and the regulator wakes up and turns on the internal circuitry to drive the output higher to repeat cycles. Output overshoot occurs when the regulator wakes up to drive the output high due to the regulator loop response delay.

FIG. 1 is a block diagram of a typical current mode switching regulator. Switching control circuit 10 may comprise any of various known controllers that provide pulse width modulated output pulses to regulate a DC output voltage $V_{OUT}$ at a level that may be greater than, lower than, or the same as a nominal input voltage $V_{IN}$. Typically, the control circuit includes a latch, having set and reset inputs, coupled to a controlled switch that supplies switched current $I_{SW}$ to inductor 12. Capacitor 14 is connected between the output $V_{OUT}$ and ground. Resistors 16 and 18 are connected in series between $V_{OUT}$ and ground. A load 20 is supplied from the regulator output.

The set input is coupled to clock 22, which may generate pulses in response to an oscillator, not shown. During the normal or "wake" mode operation, the latch is activated to initiate a switched current pulse when the set input receives each clock pulse. The switched current pulse is terminated when the reset input receives an input signal, thereby determining the width of the switched current pulse. The reset input is coupled to the output of comparator 24. An output voltage feedback signal $V_{FB}$ is taken at the junction of resistors 16 and 18 and coupled to negative input of error amplifier 26. A voltage reference $V_{REF}$ is applied to the positive input of error amplifier 26. Capacitor 28 is coupled between the output of error amplifier 26 and ground.

The level of charge of capacitor 28, and thus its voltage $V_C$, is varied in dependence upon the output of amplifier 26. As load current increases, the output voltage, and thus $V_{FB}$, decreases. As the feedback voltage $V_{FB}$ decreases, $V_C$ increases. Thus, $V_C$ is proportional to load current. $V_C$ is coupled to the inverting input of comparator 24. The non-inverting input is coupled to a signal $I_{SW}$ proportional to the sensed switch current. Upon switch activation in response to a clock set signal, switch current builds through inductor 12. When the level of $I_{SW}$ exceeds $V_C$, comparator 24 generates a reset signal to terminate the switched current pulse. During heavier loads $V_C$ increases and the switched current pulse accordingly increases to appropriately regulate the output voltage $V_{OUT}$.

When there is a sudden change in load conditions from high level load current to very low level load current, the system loop response time can be insufficient to prevent the output voltage from exceeding maximum voltage specification. The output voltage quickly decreases due to the high current draw and $V_C$ rises sharply. The switch current pulse width, responsive to the reset signal output of comparator 24, increases, driving the output voltage higher. Output voltage overshoot may exist until $V_C$ can adjust to the appropriate level.

During light load conditions, $V_{OUT}$ tends to increase and thus $V_C$ decreases. The switched current pulse width decreases. Internal circuitry, not shown, detects $V_C$ and changes the mode of operation to "sleep mode" when $V_C$ falls to a preset level, which is significantly lower than normal wake mode level. Operation returns to the "wake mode." At the initiation of the "wake mode," clock signals received at the set input again activates switching. The switched current pulses can cause output voltage overshoot before $V_C$ can adjust to the appropriate level.

FIG. 2 is a block diagram of a prior art arrangement for limiting voltage output overshoot. OR gate 30 is coupled between the output of comparator 24 and reset input of control circuit 10. Comparator 32 comprises a non-inverting input coupled to feedback signal $V_{FB}$ and an inverting input coupled to a set reference voltage $V_{REF1}$. The output of comparator 32 is coupled to the OR gate 30. The OR gate will output a reset signal when either comparator 24 or 32 outputs a high logic level. The voltage level $V_{REF1}$ is set to a level corresponding to a programmed level of overshoot, for example, at eight to ten percent higher than $V_{REF}$. When $V_{FB}$ rises to $V_{REF1}$, a reset signal will be generated by the comparator 32 through OR gate 30. Comparator 32 thus can be considered to be an over voltage protection comparator. The initiation of the overshoot reset is independent of $V_C$. During the reset condition imposed by comparator 32, no current pulses are produced. $V_{OUT}$ decreases and $V_C$ adjusts accordingly.

The threshold $V_{REF1}$ must be set high enough to accommodate the worst case of high ripple at heavy load during normal operation. As ripple does not contribute to DC voltage output, nor adversely affect the load, the threshold is set to permit operation with high ripple. In burst mode, in the transition from the sleep mode, however, because the load is light, the ripple is generally significantly less than heavy load ripple. Since $V_{REF1}$ has been set to a level matched to high ripple, when the comparator 32 is activated to reset in the transition from sleep mode, a detrimental output voltage overshoot will already have occurred. For example, at heavy load during normal operation, $V_C$ may correspond to one volt. $V_{REF1}$ has been designed to accommodate the ripple occurring from load change operation from an initial $V_C$ value of one volt. In the sleep mode, $V_C$ may typically correspond to one-half volt. At the transition to wake mode, $V_{OUT}$ already is at or near maximum level. With relatively light load at normal operation, the current pulses will drive $V_{OUT}$ higher, with considerably less ripple. $V_{REF1}$ is not low enough to prevent undesirable overshoot during the time in which $V_C$ appropriate adjusts.

The need thus exists for improved over voltage protection in switched regulator circuits.

DISCLOSURE

The present disclosure fulfills the above-described needs of the prior art. An advantage is gained, at least in part, in controlling output voltage overshoot of a switching regulator by deactivating switching operation when a signal proportional to the output voltage exceeds a threshold level, with the threshold level set as a function of regulator output current. In accordance with one disclosure embodiment, a difference signal is generated that corresponds to a difference between an output voltage feedback signal and a constant reference voltage. The generated difference signal is combined with a signal proportional to load current to obtain an adapted threshold level. The adapted threshold level is greater than the level of the constant reference voltage. A regulator switch is reset to an off state when the output voltage feedback signal exceeds the adapted threshold level.

Supply of current to the output is initiated in response to a clock pulse. The difference signal is integrated and compared with a sampled regulator current signal. The supply of current to the output is terminated when the sampled regulator current signal exceeds the integrated difference signal.

A switch control circuit, implemented in the described embodiment, has a set input for supplying current through a switch to the output and a reset input for preventing supply of current to the output. A comparator receives an output voltage feedback signal and a threshold signal that is a function of output current. An adder combines the signal proportional to output current with a bias signal to produce the threshold signal. The comparator outputs a reset signal to the switch control circuit when the output voltage feedback signal exceeds the threshold signal. A differential amplifier has a first input coupled to a reference signal and a second input coupled to the output voltage feedback signal and an output that generates a signal proportional to output current. A second comparator receives the output of the differential amplifier and a signal of sampled current through the switch. The second comparator outputs a reset signal when the sampled current signal exceeds the signal received from the differential amplifier.

A logic element, per the embodiment, is coupled to the output of the first comparator and to the output of the second comparator. The logic element output is coupled to the reset input of the switch control circuit. A clocked signal source is connected to the set input of the switch control circuit. In the absence of a reset signal output from the first comparator, switched current pulses are supplied to the output, the switched current pulses initiated in response to the clocked signal source and terminated in response reset signals output by the second comparator.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 3:
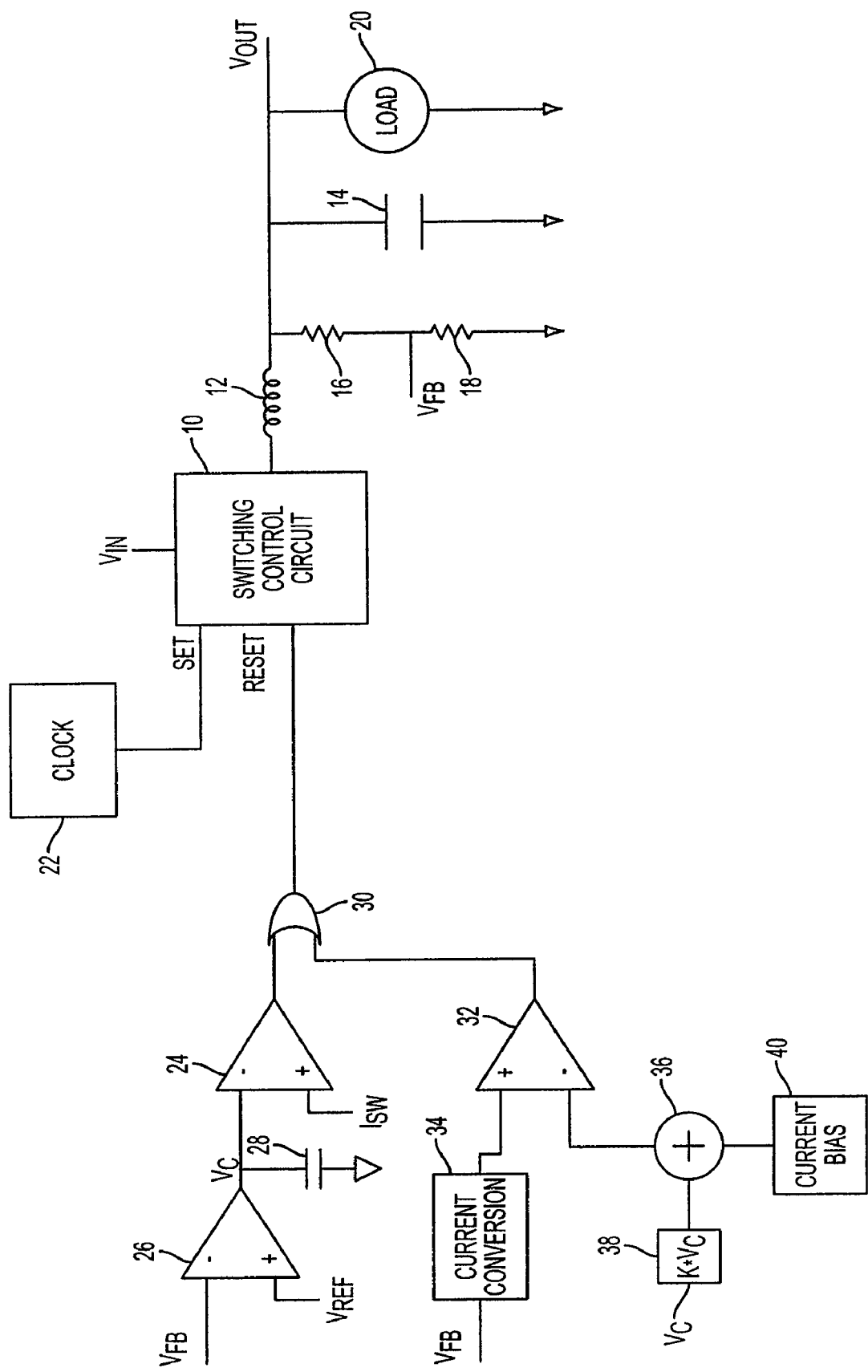
FIG. 3 is a block diagram of a switching regulator in accordance with the present invention.

FIG. 3 is a block diagram of a switching regulator in accordance with an embodiment of the present invention. It should be understood that the principles described herein are applicable to boost, buck, and buck-boost current mode switching converters that can provide a regulated output voltage, at either polarity, of any particular desired level from any given DC source. The non-inverting input of over voltage protection comparator 32 is coupled to $V_{FB}$ through voltage to current conversion block 34. The inverting input of comparator 32 is coupled to a variable threshold level signal output by adder 36. Block 38 provides an input to adder 36 that is proportional to $V_C$ by a factor K. Added to this signal is a current bias signal provided by current source 40.

In operation, $V_C$ is varied in dependence upon the output of amplifier 26 and is proportional to load current. With normal load conditions, operation is within the overvoltage threshold so that comparator 32 does not output a reset signal. Current output switching pulses are initiated by clock signals and terminated by reset signals generated by comparator 24. Pulse widths are modulated in accordance with the $V_C$ and $I_{SW}$ inputs. When changes in load occur, however, the variable threshold applied to comparator 32 produces reset signals that limit output voltage overshoot to levels appropriate to the operating mode. The threshold is higher for high load conditions during normal operation than it is light load burst mode.

Figure 1:
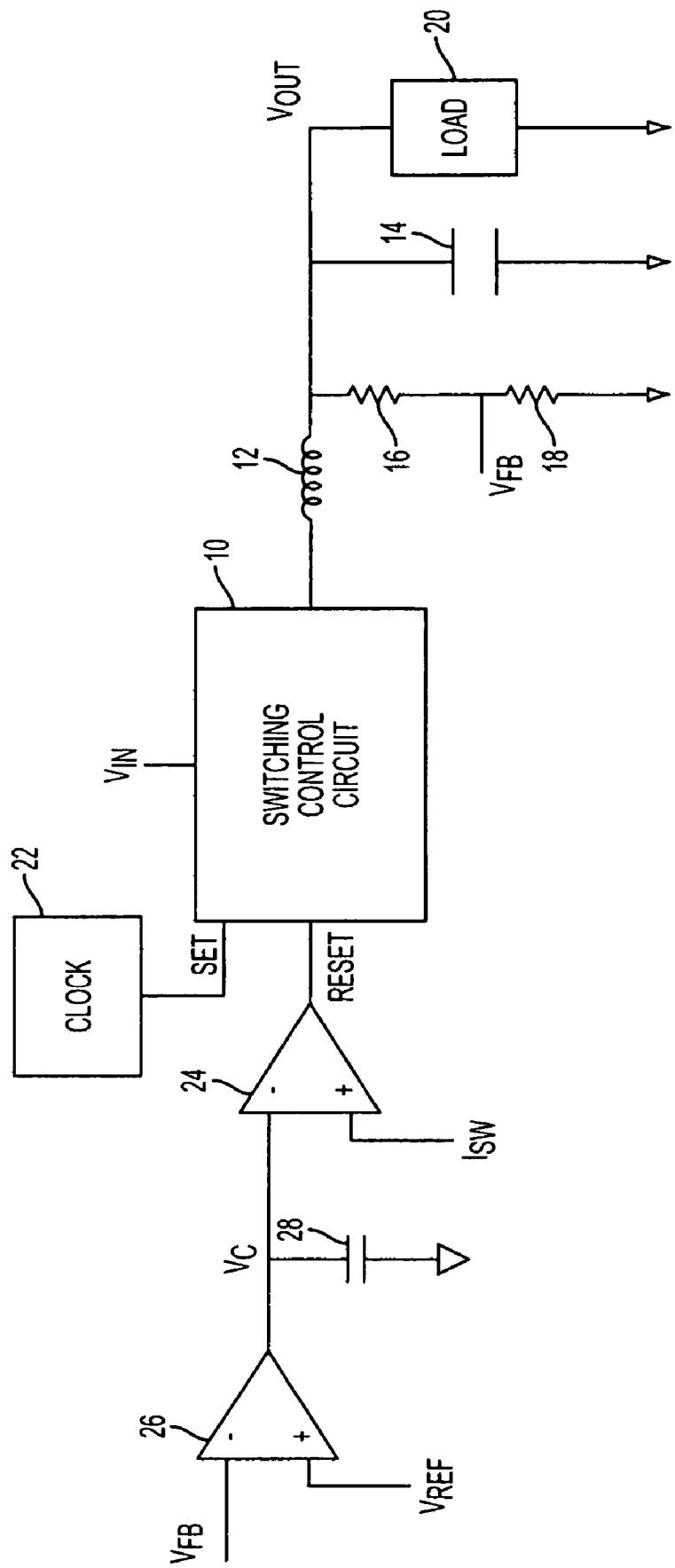
FIG. 1 is a block diagram of a switching regulator of the prior art.
Figure 2:
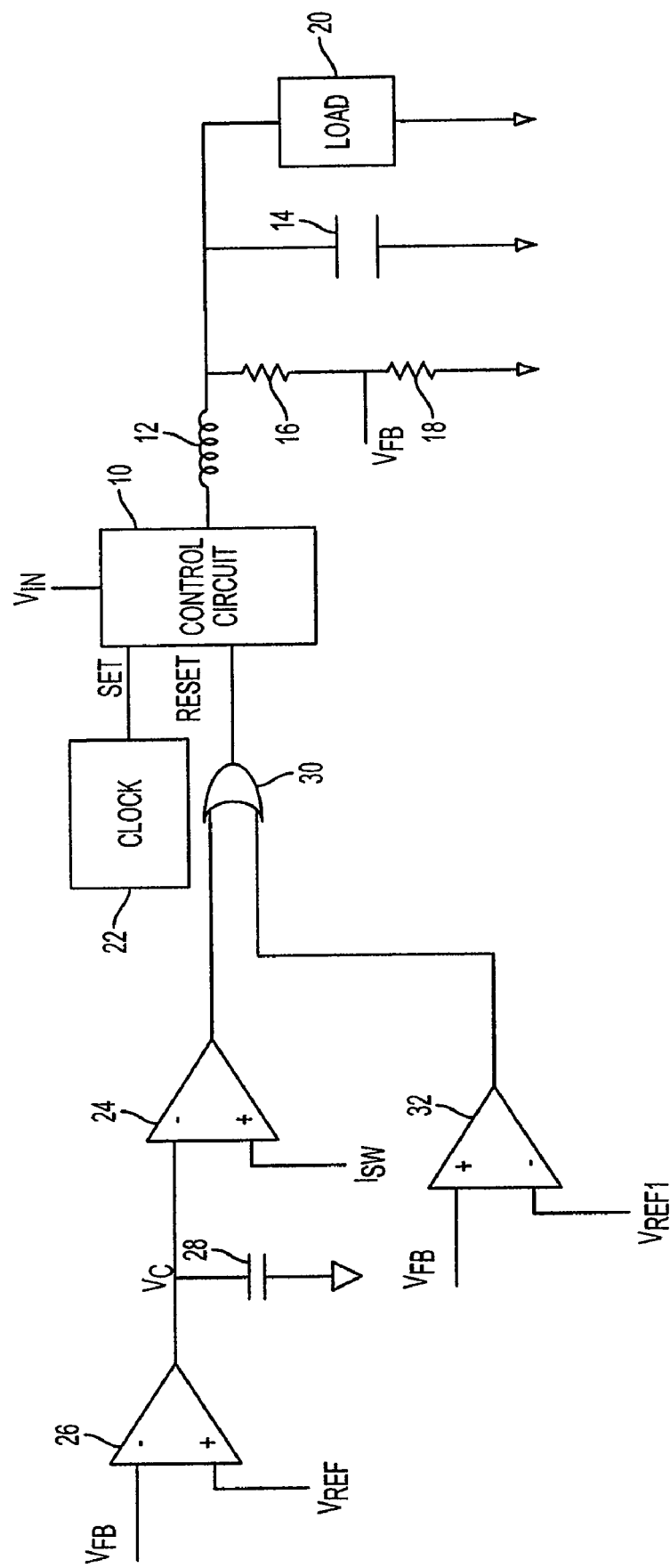
FIG. 2 is a block diagram of a prior art switching regulator having a set over voltage threshold.

The variable threshold level applied to comparator 32 tracks with $V_C$, which is directly proportional to output load level. The load level is higher during normal operation than in the sleep mode. The values of factor K and the current bias are selected to establish a threshold level that corresponds to the $V_{REF1}$ level of FIG. 2 for normal operation with high load level and a threshold level that is reduced from the $V_{REF1}$ level when transitioning from the sleep mode. The variable threshold may permit overshoots, for example, of eight to ten percent during normal operation and three percent during the transition operation in sleep mode.

Figure 4:
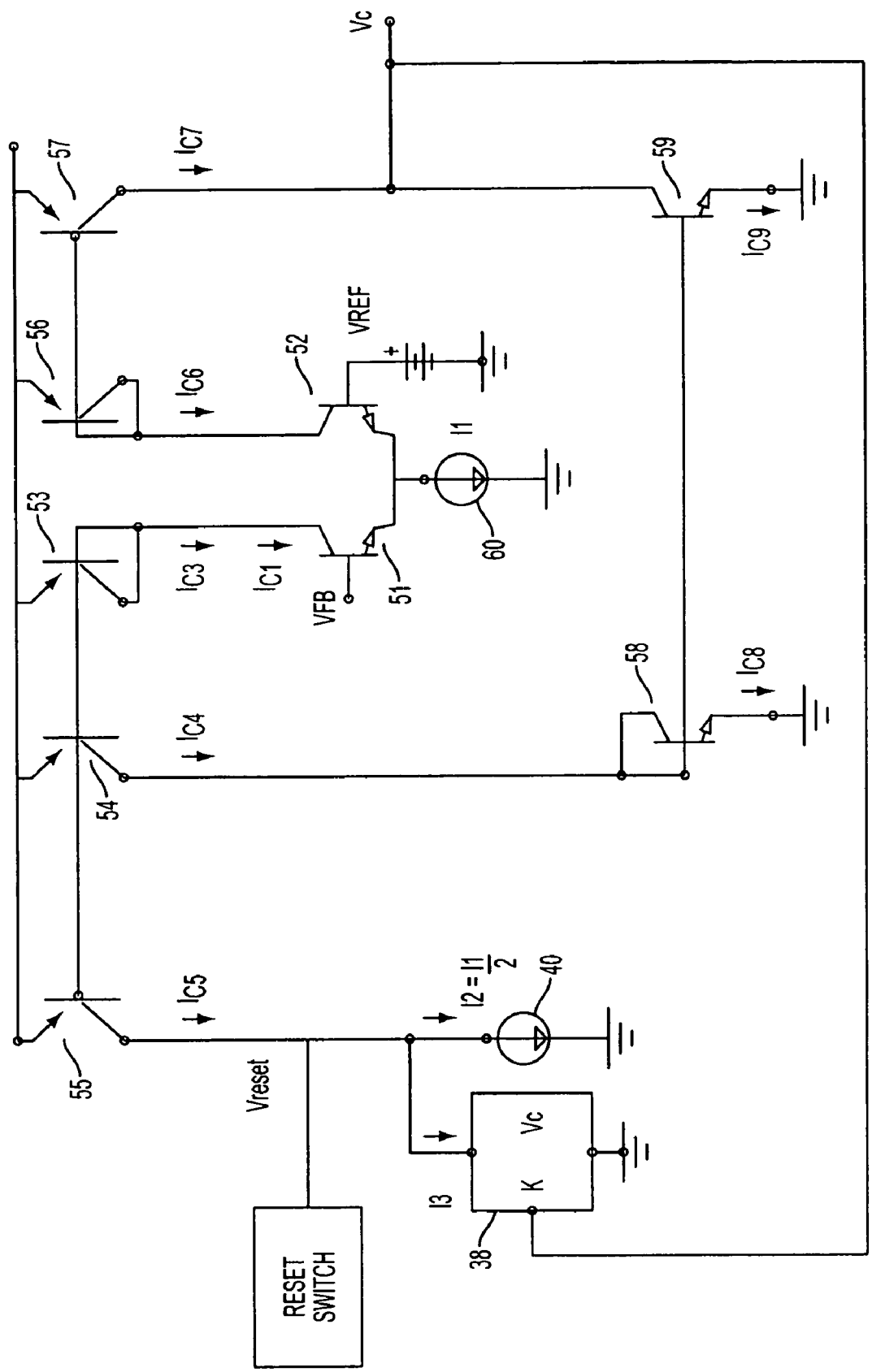
FIG. 4 is a circuit diagram of an over voltage protection circuit for the switching regulator of FIG. 3.

FIG. 4 is a circuit diagram of the over voltage protection circuit of FIG. 3. The over voltage comparator is merged with the voltage feedback amplifier, which share the same input stage formed by transistors 51 and 52. Transistor 51, which receives $V_{FB}$ at its base, and transistor 52, which receives $V_{REF}$ at its base, form a differential pair, corresponding the differential amplifier 26. The circuit is configured as a transconductance amplifier. Transistor 53 is the active load for transistor 51 of the input stage. Transistor 56 is the active load for transistor 52. The transconductance of the amplifier is determined by the bias current $I_1$ at current source 60. Transistors 54, 57, 58 and 59 are current mirrors to transfer signal to the output stage formed by transistors 57 and 59. $V_C$ is output by this stage. Transistors 53, 54, and 55 are current mirrors with the same collector current; Ic3=Ic4=Ic5; Ic6=Ic7; Ic8=Ic9.

The over voltage comparator protection circuit of FIG. 3 corresponds to the following elements. Transistor 55 mirrors transistor 53 to transfer collector current Ic1 of transistor 51 to the output node $_{reset}$. Ic1 is being compared to the sum of a constant bias current I2 and the adaptive current I3 controlled by the amplifier output $V_C$. When Ic5 is greater than the sum of I2 and I3, $V_{reset}$ will go high to reset and stop the regulator switch to curtail the output overshoot. Otherwise, $V_{reset}$ stays low. This functionality corresponds to comparator 32 of FIG. 3.

The threshold is the input voltage ($V_{FB}-V_{REF}$) required to drive Ic1 through Ic5 to be equal to the sum of I2 and I3 to drive $V_{reset}$ high. Therefore, the sum of I2 and I3 determines the threshold of comparator 32. By making I2 constant and equal to I1/2, and making I3 equal to $K*V_C$, where K is a positive constant, the threshold will go up with increasing $V_C$. Because the regulator output voltage is determined by $V_{REF}$, at the positive input of the amplifier, the threshold for over voltage is referred to $V_{REF}$ for a common reference. ($V_{FB}-V_{REF}$) is equal to the threshold when the reset signal is generated.

The following illustrates design considerations for the circuit. From the bipolar transistor base-emitter voltage and collector current relationship, Vbe=Vt ln (Ic/Is), where Vbe=base emitter voltage of the transistor, Vt=transistor thermal voltage kt/q, and equal to 26 mV at room temperature; Ic=transistor collector current, and Is=transistor saturation current. All transistors are selected to have the same matching sizes so that Is1=Is2, Is8=Is9.

$$V_{FB} - V_{REF} = Vbe1 - Vbe2$$
$$= Vt\ln(Ic1/Is2) - Vt\ln(Ic2/Is2)$$
$$= Vt\ln[(Ic1 \times Is2)/Is1 \times Ic2)]$$
$$= Vt\ln(Ic1/Ic2);$$
$$\text{as } I1 = Ic1 + Ic2, \ V_{FB} - V_{REF} = Vt\ln[Ic1/(I1-Ic1)];$$
$$Ic1/(I1-Ic1) = \exp(V_{FB}-V_{REF})/Vt$$

For an exemplary circuit, $V_{REF}$ may be set to 0.8V. If it is assumed, arbitrarily, that $V_C$ is equal to 1V corresponding to a heavy regulator output load, and that 8% overshoot is the maximum acceptable level, $V_{FB}-V_{REF}$=64 mV.

Ic1/(I1-Ic1)=exp ($V_{FB}-V_{REF}$)Vt=exp 64 mV/26 mV=11.7

Thus Ic1~0.92 I1 for $V_C$=1 V.

If it is assumed that $V_C$ is equal to 0.5V corresponding to a sleep mode output load, and that 3% overshoot is the maximum acceptable level, $V_{FB}-V_{REF}$=24 mV.

Ic1/(I1-Ic1)=exp ($V_{FB}-V_{REF}$)Vt=exp 24 mV/26 mV=2.5

Thus Ic1~0.71 I1 for $V_C$=0.5V.

K will thus be equal to 0.42 for the comparator to clamp the overshoot level of the switching regulator to 8% at heavy load and only 3% at light load.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A switching circuit for regulating an output, comprising:
   a switch control circuit having a set input for supplying current to the output and a reset input for preventing supply of current to the output;
   a comparator having a first input for receiving an output voltage feedback signal, a second input for receiving an overshoot threshold signal established to limit voltage overshoot at the output of the switching circuit when load current is at a first level, and an output coupled to the reset input of the switch control circuit; the overshoot threshold signal being reduced when the load current is at a second level lower than the first level; the comparator being configured to output a reset signal supplied to the reset input when the signal at the first input exceeds the signal at the second input; and
   a differential amplifier having a first input coupled to a reference signal and a second input coupled to the output voltage feedback signal and an output that generates a signal proportional to output current.

2. A switching circuit as recited in claim 1, wherein the second input of the comparator is coupled to an adder that combines the signal proportional to output current with a bias signal.

3. A switching circuit as recited in claim 2, further comprising a second comparator having a first input coupled to the output of the differential amplifier, a second input coupled to receive a signal of sampled current, and an output coupled to the reset input of the switch control circuit;
   wherein the second comparator outputs a reset signal when the signal at its second input exceeds the signal at its first input.

4. A switching circuit as recited in claim 3, wherein the level of the signal coupled to the first input of the first comparator is greater than the level of the reference signal.

5. A switching circuit as recited in claim 3, further comprising: a logic element having a first input coupled to the output of the first comparator and a second input coupled to the output of the second comparator and an output coupled to the reset input of the switch control circuit; and
   a clocked signal source connected to the set input of the switch control circuit; wherein:
   in the absence of a reset signal output from the first comparator, switched current pulses are supplied to the output, the switched current pulses initiated in response to the clocked signal source and terminated in response reset signals output by the second comparator.

6. A circuit for limiting output voltage overshoot of a switching regulator, comprising:
   a first circuit portion configured for producing a signal proportional to output voltage of the regulator;
   a second circuit portion configured for deactivating switching operation of the regulator when the signal proportional to the output voltage produced by the first circuit portion exceeds an overshoot threshold level established to limit the overshoot voltage at a first level of regulator load current; and
   a third circuit portion configured for reducing the overshoot threshold level when the regulator load current is at a second level lower than the first level.

* * * * *